(12) United States Patent
Piccin et al.

(10) Patent No.: US 9,352,483 B2
(45) Date of Patent: May 31, 2016

(54) METHOD FOR MANUFACTURING A MOTOR VEHICLE LINING HAVING A COATING THAT INCLUDES A LIGNEOUS LAYER AND A BACK REINFORCEMENT LAYER

(75) Inventors: Hugo Piccin, Paris (FR); Nathalie Durand, Cergy (FR)

(73) Assignee: Faurecia Interieur Industrie, Nanterre (FR)

( * ) Notice: Subject to any disclaimer, the term of this patent is extended or adjusted under 35 U.S.C. 154(b) by 831 days.

(21) Appl. No.: 13/393,356

(22) PCT Filed: Aug. 25, 2010

(86) PCT No.: PCT/FR2010/051770
§ 371 (c)(1),
(2), (4) Date: Jun. 18, 2012

(87) PCT Pub. No.: WO2011/023901
PCT Pub. Date: Mar. 3, 2011

(65) Prior Publication Data
US 2012/0247654 A1    Oct. 4, 2012

(30) Foreign Application Priority Data
Aug. 31, 2009   (FR) .................................... 09 55925

(51) Int. Cl.
B29C 45/00  (2006.01)
B27D 1/00   (2006.01)
B27D 1/08   (2006.01)
B29L 31/00  (2006.01)

(52) U.S. Cl.
CPC .............. B27D 1/083 (2013.01); B29C 45/00 (2013.01); B29L 2031/757 (2013.01); Y10T 156/1043 (2015.01)

(58) Field of Classification Search
None
See application file for complete search history.

(56) References Cited

U.S. PATENT DOCUMENTS

| 2,466,966 | A   | * | 4/1949  | Prance et al. ................. 156/214 |
| 5,915,724 | A   | * | 6/1999  | Daris et al. .................. 280/728.3 |
| 6,875,300 | B1  | * | 4/2005  | Grant ............................. 156/214 |
| 6,887,413 | B1  | * | 5/2005  | Schumacher ................. 264/135 |
| 2005/0241757 | A1 | * | 11/2005 | Gomez ................... B29C 51/14 156/307.3 |
| 2007/0160799 | A1 | * | 7/2007  | Nguyen ............... C08G 63/916 428/74 |
| 2010/0066121 | A1 | * | 3/2010  | Gross ......................... 296/146.5 |

FOREIGN PATENT DOCUMENTS

DE    102007024529 A1    11/2008
WO    2009045202 A1     4/2009

OTHER PUBLICATIONS

International Search Report for PCT/FR2010/051770, dated Dec. 20, 2010, 2 pages (translated).
Written Opinion for PCT/FR2010/051770, dated Dec. 20, 2010, 6 pages (in French only).

* cited by examiner

*Primary Examiner* — Barbara J Musser
(74) *Attorney, Agent, or Firm* — Reising Ethington P.C.

(57) ABSTRACT

The invention relates to a method in which the coating (6) is thermoformed and the coating (6) is cut in at least one cutting region (18). According to one aspect of the invention, the reinforcement layer (12) is impregnated with a thermosetting resin at least in one cutting region (18), and the coating (6) is cut in the cutting region after the thermoforming of the coating and the setting of the thermosetting resin.

20 Claims, 2 Drawing Sheets

METHOD FOR MANUFACTURING A MOTOR VEHICLE LINING HAVING A COATING THAT INCLUDES A LIGNEOUS LAYER AND A BACK REINFORCEMENT LAYER

TECHNICAL FIELD

The present invention relates to a method for manufacturing a lining, in particular an interior lining for a motor vehicle, comprising a stratified coating comprising at least one ligneous layer and one porous reinforcement layer adhered to the back of the ligneous layer, of the type in which the coating is thermoformed and the coating is cut in at least one cutting region.

BACKGROUND

For esthetic reasons, it is desirable to provide linings provided with a coating having a wood sheet and shaped to give it a three-dimensional shape.

FR 2 922 137 discloses a coating comprising a wood sheet provided with a flexible reinforcement layer glued on the back of the wood sheet, the reinforcement layer being a textile such as a fabric or a nonwoven, a paper or a rubber sheet, the coating also comprising a protective layer on the wood sheet, having elasticity properties to facilitate the shaping of the coating.

It may prove necessary to cut the coating to form its edges or to arrange an opening therein, for example to insert an electric switch or an opening control for a door. The cut edges can have appearance flaws due to the fibrous nature of the wood sheet and possibly of the reinforcement layer.

These flaws can for example be treated through the local application of a resin on the cut edges. Nevertheless, these operations are difficult to automate and must therefore be done manually.

Otherwise, these cut edges may be concealed by covers. Nevertheless, these covers may damage the esthetics and perceived quality, and necessarily cause additional costs.

SUMMARY OF THE INVENTION

One aim of the invention is to propose a manufacturing method making it possible to shape the coating while decreasing the appearance flaws of the cut edges.

To that end, the invention proposes a method of the aforementioned type, characterized in that the reinforcement layer is impregnated with a thermosetting resin at least in one cutting region, and the coating is cut in the cutting region after the thermoforming of the coating and the setting of the thermosetting resin.

According to other embodiments, the method comprises one or more of the following features, considered alone or according to all technically possible combinations:

- the reinforcement layer is provided in the form of a woven or nonwoven textile material;
- the reinforcement layer is impregnated with a resin chosen from amongst: polyester, epoxide, phenolic, polyimide, melamine, vulcanized rubber;
- the coating is fixed on a substrate to form a vehicle interior trim; and
- the coating is thermoformed and the coating is fixed on the substrate at the same time through thermocompression of the coating on the substrate, the thermosetting resin setting during the thermocompression.

BRIEF DESCRIPTION OF THE DRAWINGS

The invention will be better understood upon reading the following description, provided solely as an example, and done in reference to the appended drawings, in which.

DESCRIPTION OF THE ILLUSTRATED EMBODIMENT

Figure 1:
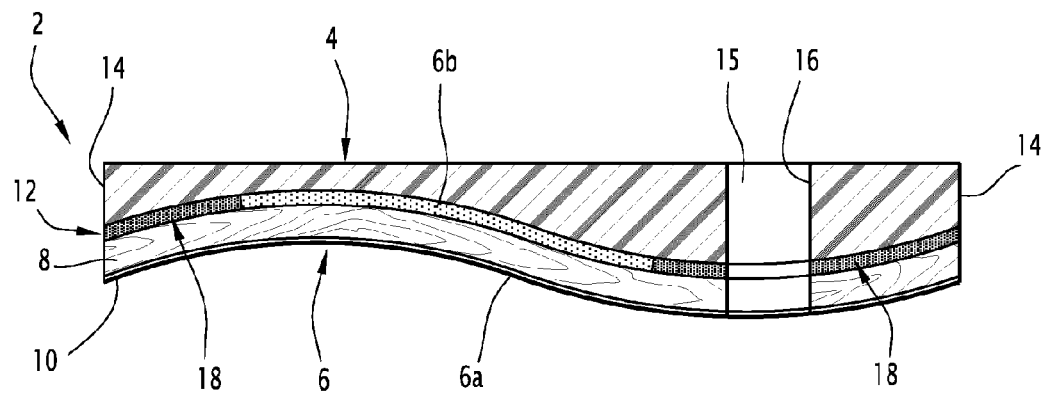
FIG. 1 is a partial cross-sectional view of an interior lining for a motor vehicle comprising a substrate made from a plastic material and a visible coating.

FIG. 1 shows a motor vehicle interior lining, or trim, 2 that comprises a plastic substrate 4 and a visible coating 6 covering the substrate 4.

The coating 6 is positioned on the visible surface of the trim 2. It comprises a visible front surface 6a turned to the side opposite the substrate 4, and a rear surface 6b in contact with the substrate 4.

The coating 6 is stratified and comprises at least one ligneous layer 8 made from natural wood. As shown in FIG. 1, the coating 6 comprises a single ligneous layer 8. Optionally, the coating 6 comprises several ligneous layers 8 that are superimposed and glued together.

The coating 6 comprises a protective layer 10 covering the ligneous layer 8 on the front surface 6a side.

The purpose of the protective layer 10 is to protect the ligneous layer 8, in particular from the ultraviolet radiation that can cause accelerated aging of the ligneous layer 8. The protective layer 10 is for example a synthesis resin, for example a varnish, and is colored, transparent or translucent.

The protective layer 10 is for example applied by projection on the ligneous layer 8.

The coating 6 comprises a flexible reinforcement layer 12 covering the ligneous layer 8 on the rear surface 6b side.

The purpose of the reinforcement layer 12 is to reinforce the ligneous layer 8 on the back thereof and to promote the connection of the coating 6 with the substrate 4 during fastening thereof on the back of the coating 6.

The reinforcement layer 12 is porous. This for example involves a layer of textile material, in particular a fabric or a nonwoven, a paper, or a rubber sheet.

The reinforcement layer 12 is for example laminated on the back of the ligneous layer 8.

Such a coating 6 is sometimes called a stratified ligneous complex, due to the superposition of layers including a ligneous layer.

As illustrated in FIG. 1, the lining 2 comprises cut marginal edges 14 and an opening 15 delimited by a cut peripheral edge 16.

The reinforcement layer 12 is impregnated with a thermosetting resin. The reinforcement layer 12 is impregnated with thermosetting resin at least in the cutting zones 18 of the coating 6. The reinforcement layer 12 is preferably impregnated only in the cutting zones 18 or over its entire surface.

The thermosetting resin is applied on the back of the reinforcement layer 12 or between the reinforcement layer 12 and the back of the ligneous layer 8, during manufacturing of the coating 6.

The thermosetting resin impregnates at least the reinforcing layer 12, and can in practice also impregnate the ligneous layer 8.

The purpose of the thermosetting resin is to make the coating more homogenous in the impregnated zones by filling in the voids in the reinforcement layer and possibly the ligneous layer, and to set the coating in the impregnated zones to obtain cleaner cut edges.

The resin used has a Young's modulus after setting that is preferably comprised between 1,500 and 7,000 MPa.

The thermosetting resin is provided to set due to the thermoforming of the coating 6, i.e. under the effect of the heat contributed to the coating during thermoforming thereof.

The thermosetting resin is for example chosen from amongst: polyester, epoxide, phenolic, polyimide, melamine, vulcanized rubber.

According to the invention, the coating 6 is provided comprising the ligneous layer 8, the protective layer 10, and the reinforcement layer 12 impregnated with the thermosetting resin, which is not set, polymerized, or cured. Furthermore, the substrate 4 is for example supplied by injection molding of plastic material in a molding mold through suitable injection.

Figure 2:
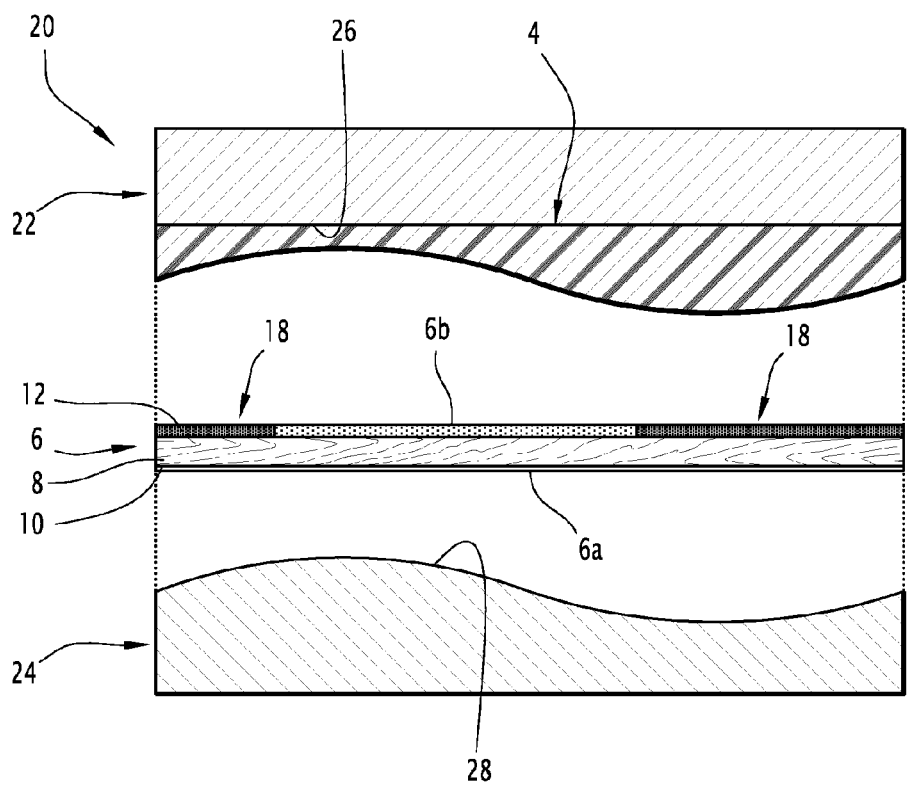
FIGS. 2 and 3 are diagrammatic cross-sectional views of a thermocompression press, illustrating different steps of a method for manufacturing the trim of FIG. 1, according to the invention.
Figure 3:
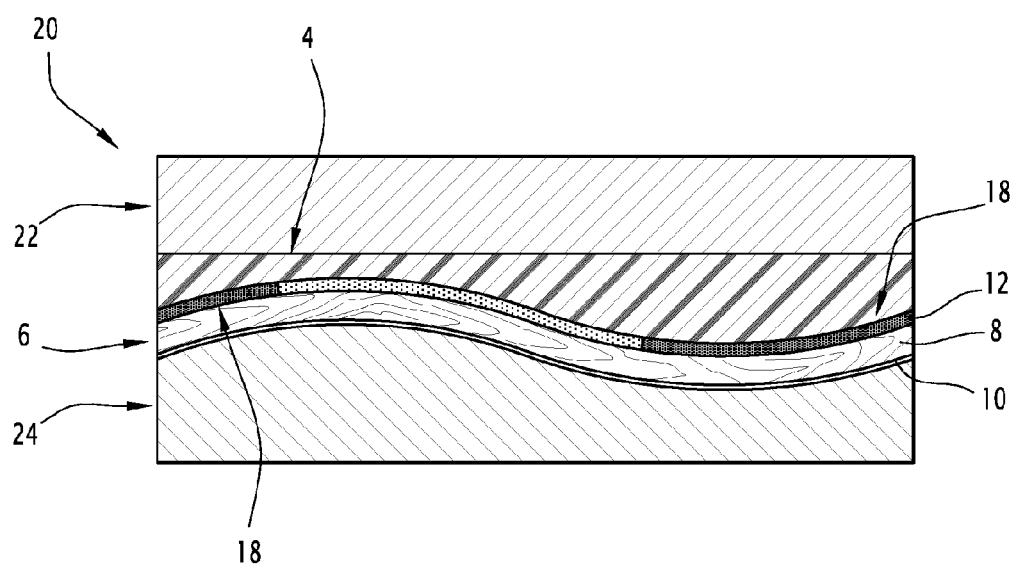

The coating 6 is then thermoformed and fixed on the substrate 4 by thermocompression of the coating 6 against the substrate 4 in a hot press as illustrated in FIGS. 2 and 3.

As illustrated in FIGS. 2 and 3, the press 20 has an upper portion 22 and a lower portion 24 that are complementary and movable relative to one another so as to open the press 20 by moving the upper 22 and lower 24 portions apart (FIG. 2) and close the press 20 by bringing the upper 22 and lower 24 portions back together (FIG. 3).

The upper portion 22 comprises a support surface 26 for receiving the substrate 4 previously formed.

The lower portion 24 comprises a forming surface 28 provided to form the coating 6 pressed against that forming surface 28. It has a three-dimensional shape corresponding to the desired final three-dimensional shape for the coating 6. The forming surface 28 can in particular be a non-developable surface.

The support surface 26 and the forming surface 28 are positioned opposite one another.

According to the manufacturing method, the press 20 is opened, the back of the substrate 4 is positioned bearing against the support surface 26, and one positions the coating 6, which is initially substantially flat, between the substrate 4 and the forming surface 28 (FIG. 2), the rear surface 6b and the reinforcement layer 12 of the coating 6 being turned toward the substrate 4.

Then, the coating 6 is thermoformed and the coating 6 is thermocompressed against the substrate 6 by closing the press 20. Due to the closing of the press 20, the substrate 4 is pressed against the coating 6, which enables the thermocompression, and presses the coating 6 against the forming surface 28, which allows thermoforming of the coating between the substrate 4 and the forming surface 6.

The closing speed of the press 20 is the speed at which the press portions 22, 24 are brought back together. At the end of travel, i.e. 5 to 10 mm before closing of the press 20, the end-of-travel speed is preferably comprised between 0.5 mm/s and 1 mm/min to allow the temperature of the coating 6 to rise.

During these operations, the press 20 is kept at a temperature favoring the fastening of the substrate 4 on the reinforcing layer 12. This temperature is for example comprised between 70 and 180° C.

During the thermoforming and thermocompression, the thermosetting resin sets.

The necessary cuts are then made in the coating 6 after setting of the thermosetting resin.

The edges 14 of the coating are cut in the press 20, after setting of the thermosetting resin, for example using knives provided to that end, or after having removed the lining 2 from the press 20.

The opening 15 is for example cut by milling after having removed the lining 2 from the press 20.

The thermosetting resin contributes homogeneity by forming a binder in the reinforcement layer 12 or alternatively in the reinforcement layer 12 and in the ligneous layer 8, and increases the Young's modulus in the impregnated cutting regions 18. As a result, the cut edges will have a sharper and cleaner cut. In this way, it is possible to leave these edges visible, without any subsequent expensive treatment and without adding wheel covers.

The manufacturing method is carried out simply, on already-existing thermopresses inasmuch as the thermosetting resin sets due to the heat contributed during the thermocompression. Furthermore, the unset thermosetting resin does not oppose the shaping of the coating.

The invention claimed is:

1. A method for manufacturing an interior lining for a motor vehicle, the interior lining comprising a pre-formed substrate and a stratified coating fixed on the substrate, the coating being a stratified complex comprising a ligneous layer and a porous reinforcement layer adhered to the back of the ligneous layer, the method comprising the steps of:
   providing the coating, wherein the reinforcement layer is impregnated with a thermosetting resin at least in one cutting region of the coating,
   thermoforming the coating, the thermosetting resin being provided to set due to the thermoforming of the coating,
   cutting the coating in the cutting region after the thermoforming of the coating and the setting of the thermosetting resin, and
   fixing the coating onto a surface of the pre-formed substrate,
   wherein the surface of the pre-formed substrate has a three-dimensional shape before the step of fixing the coating, and the step of thermoforming the coating includes forming the coating to have the same three-dimensional shape.

2. The method according to claim 1, wherein the reinforcement layer is provided in the form of a woven or nonwoven textile material.

3. The method according to claim 1, wherein the reinforcement layer is impregnated with a resin chosen from amongst: polyester, epoxide, phenolic, polyimide, melamine, vulcanized rubber.

4. The method according to claim 1, wherein the coating is thermoformed and the coating is fixed on the pre-formed substrate at the same time through thermocompression of the coating on the substrate, the thermosetting resin setting during the thermocompression.

5. The method according to claim 1, wherein the coating is thermoformed against the pre-formed substrate in a hot press.

6. The method according to claim 5, wherein 5 mm to 10 mm before closing of the press, the closing speed of the press is between 0.5 mm/s and 1 mm/min.

7. The method according to claim 1, wherein the coating is thermoformed against the pre-formed substrate.

8. The method according to claim 1, wherein the ligneous layer is a decorative layer having a surface facing away from the substrate and that is visible from the interior of the motor vehicle when installed in the motor vehicle.

9. The method according to claim 8, wherein the ligneous layer is a wood veneer layer.

10. A method for manufacturing an interior lining for a motor vehicle, the interior lining comprising a pre-formed substrate and a stratified coating fixed on the substrate, the coating being a stratified complex comprising a ligneous layer and a porous reinforcement layer adhered to the back of the ligneous layer, the method comprising the steps of:

provinding the coating, wherein the reinforcement layer is impregnated with a thermosetting resin at least in one cutting region of the coating, thermoforming the coating, the thermosetting resin being provided to set due to the thermoforming of the coating, cutting the coating in the cutting region after the thermoforming of the coating and the setting of the thermosetting resin, and fixing the coating onto the pre-formed substrate, wherein the substrate is pre-formed by injection molding.

11. The method according to claim 10, wherein the reinforcement layer is provided in the form of a woven or non-woven textile material.

12. The method according to claim 10, wherein the reinforcement layer is impregnated with a resin chosen from amongst: polyester, epoxide, phenolic, polyimide, melamine, vulcanized rubber.

13. The method according to claim 10, wherein the coating is thermoformed and the coating is fixed on the pre-formed substrate at the same time through thermocompression of the coating on the substrate, the thermosetting resin setting during the thermocompression.

14. A method for manufacturing an interior lining for a motor vehicle, the interior lining comprising a stratified coating having a ligneous layer and a porous reinforcement layer adhered to the back of the ligneous layer, wherein the method comprises the steps of thermoforming the coating with a thermosetting resin that is impregnated in the reinforcement layer only in at least one cutting region of the coating such that regions of the reinforcement layer that are not cutting regions are not impregnated with the thermosetting resin, setting the thermosetting resin during the thermoforming step; and cutting the coating in the cutting region after the thermoforming and setting steps.

15. A method for manufacturing an interior lining for a motor vehicle, the interior lining comprising a pre-formed substrate and a stratified coating fixed on the substrate, the coating being a stratified complex comprising a ligneous layer and a porous reinforcement layer adhered to the back of the ligneous layer, the method comprising the steps of:

providing the coating, wherein the reinforcement layer is impregnated with a thermosetting resin at least in one cutting region of the coating, thermoforming the coating, the thermosetting resin being provided to set due to the thermoforming of the coating, cutting the coating in the cutting region after the thermoforming of the coating and the setting of the thermosetting resin, and fixing the coating onto the pre-formed substrate, wherein the ligneous layer is a decorative layer having a surface facing away from the substrate and that is visible from the interior of the motor vehicle when installed in the motor vehicle.

16. The method according to claim 15, wherein the ligneous layer is a wood veneer layer.

17. The method according to claim 16, wherein a surface of the pre-formed substrate facing the coating has a three-dimensional shape before the step of fixing the coating, and the step of thermoforming the coating includes forming the coating to have the same three-dimensional shape.

18. The method according to claim 15, wherein the reinforcement layer is provided in the form of a woven or non-woven textile material.

19. The method according to claim 15, wherein the reinforcement layer is impregnated with a resin chosen from amongst: polyester, epoxide, phenolic, polyimide, melamine, vulcanized rubber.

20. The method according to claim 15, wherein the coating is thermoformed and the coating is fixed on the pre-formed substrate at the same time through thermocompression of the coating on the substrate, the thermosetting resin setting during the thermocompression.

\* \* \* \* \*